(12) United States Patent
Tsukamoto (10) Patent No.: US 11,560,141 B2
(45) Date of Patent: Jan. 24, 2023

(54) VEHICLE

(71) Applicant: HONDA MOTOR CO., LTD., Tokyo (JP)

(72) Inventor: Yoshito Tsukamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 16/937,001

(22) Filed: Jul. 23, 2020

(65) Prior Publication Data

US 2021/0031749 A1 Feb. 4, 2021

(30) Foreign Application Priority Data

Jul. 29, 2019 (JP) .............................. JP2019-138440

(51) Int. Cl.
*B60W 20/50* (2016.01)

(52) U.S. Cl.
CPC ....... *B60W 20/50* (2013.01); *B60W 2510/081* (2013.01); *B60W 2510/087* (2013.01); *B60W 2710/021* (2013.01)

(58) Field of Classification Search
CPC .......... B60W 20/50; B60W 2510/081; B60W 2510/087; B60W 2710/021; B60W 10/02; B60W 10/08; B60W 10/10; B60W 30/181; B60W 10/06; B60W 20/00; Y02T 10/62; B60K 6/38; B60K 6/24; B60K 6/26; B60K 6/36

See application file for complete search history.

(56) References Cited

U.S. PATENT DOCUMENTS

| | | | | |
|---|---|---|---|---|
| 9,085,299 | B2 * | 7/2015 | Takahashi | B60W 10/08 |
| 9,610,941 | B2 * | 4/2017 | Kuwamoto | B60W 20/50 |
| 2015/0148186 | A1 * | 5/2015 | Uchida | B60W 10/11 |
| | | | | 477/3 |
| 2015/0375739 | A1 * | 12/2015 | Ohkubo | B60W 10/06 |
| | | | | 180/65.23 |
| 2017/0158043 | A1 | 6/2017 | Tsukamoto | |

FOREIGN PATENT DOCUMENTS

| | | | | |
|---|---|---|---|---|
| JP | 2009083671 A | * | 4/2009 | |
| JP | 2017-100590 A | | 6/2017 | |
| JP | 6318909 B2 | * | 5/2018 | B60K 6/442 |

* cited by examiner

*Primary Examiner* — Dirk Wright
*Assistant Examiner* — Aimee Tran Nguyen
(74) *Attorney, Agent, or Firm* — Carrier, Shende & Associates, PC; Joseph P. Carrier; Fulchand P. Shende (57) ABSTRACT

A vehicle includes a first rotary electric machine, a second rotary electric machine, and a control circuit. When the control circuit determines that a failure has occurred in the first rotary electric machine, the control circuit places the first rotary electric machine and a first transmission path as a power transmission path of the vehicle in the disconnection state, and places the second rotary electric machine and the first transmission path in the connection state. Further, when the control circuit determines that a failure has occurred in the second rotary electric machine, the control circuit places the first rotary electric machine and a first transmission path in the connection state, and place the second rotary electric machine and the first transmission path in the disconnection state.

4 Claims, 6 Drawing Sheets

| VEHICLE OPERATION | MOVEMENT START | ACCELERATION | CRUISING | DECELERATION | VEHICLE STOP |
|---|---|---|---|---|---|
| GEN | | | FAILURE STOP | | |
| GEN CLUTCH | | | OFF | | |
| TRC | POWER RUNNING | POWER RUNNING | ELECTRIC POWER GENERATION | REGENERATION | STOP |
| TRC CLUTCH | ON | ON | ON | ON | ON |
| ENG | STOP | STOP | DRIVING | STOP | STOP |
| ENG CLUTCH | OFF | OFF | ON | OFF | OFF |

| VEHICLE OPERATION | MOVEMENT START | ACCELERATION | CRUISING | DECELERATION | VEHICLE STOP |
|---|---|---|---|---|---|
| GEN | POWER RUNNING | POWER RUNNING | ELECTRIC POWER GENERATION | REGENERATION | ELECTRIC POWER GENERATION |
| GEN CLUTCH | ON | ON | ON | ON | ON |
| TRC | | | FAILURE STOP | | |
| TRC CLUTCH | | | OFF | | |
| ENG | DRIVING | DRIVING | DRIVING | ROTATION BY EXTERNAL FORCE | DRIVING |
| ENG CLUTCH | ON | ON | ON | ON | OFF |

VEHICLE

CROSS-REFERENCE TO RELATED APPLICATION

This application is based upon and claims the benefit of priority from Japanese Patent Application No. 2019-138440 filed on Jul. 29, 2019, the contents of which are incorporated herein by reference.

BACKGROUND OF THE INVENTION

Field of the Invention

The present invention relates to a vehicle including an internal combustion engine and two rotary electric machines.

Description of the Related Art

As described in Japanese Laid-Open Patent Publication No. 2017-100590, a hybrid vehicle is equipped with a generator and a traction motor, in addition to an internal combustion engine and a high voltage battery. Each of the generator and the traction motor is a rotary electric machine including a rotor which has a permanent magnet and rotates together with a rotary axis, and a stator including a magnetic coil which faces the permanent magnet. That is, in this case, the hybrid vehicle includes the internal combustion engine and the two rotary electric machines.

The generator performs electric power generation using motive power of the internal combustion engine. On the other hand, the traction motor is driven using electrical energy of at least either the generator or the high voltage battery. Then, the power generated by the internal combustion engine or the traction motor is transmitted to wheels, and the wheels rotate to enable travel of the vehicle.

SUMMARY OF THE INVENTION

The present invention has been made in relation to the technique described in Japanese Laid-Open Patent Publication No. 2017-100590, and a main object of the present invention is to provide a vehicle which can travel even in the case where it is determined that a failure has occurred in any of two rotary electric machines.

According to an embodiment of the present invention, a vehicle includes an internal combustion engine, a first transmission path configured to transmit power generated by the internal combustion engine to wheels, a first switching device disposed in the first transmission path, and configured to performing switching of the internal combustion engine and the wheels between a connection state and a disconnection state, a first rotary electric machine, a first branch point provided in the first transmission path, more on a side of the internal combustion engine than the first switching device is, a second transmission path configured to connect the first branch point and the first rotary electric machine, a second switching device disposed in the second transmission path, and configured to perform switching of the first transmission path and the first rotary electric machine between a connection state and a disconnection state, a second rotary electric machine, a second branch point provided in the first transmission path, more on a side of the wheels than the first switching device is, a third transmission path configured to connect the second branch point and the second rotary electric machine, a third switching device disposed in the third transmission path, and configured to perform switching of the first transmission path and the second rotary electric machine between a connection state and a disconnection state, a control circuit configured to control the first switching device, the second switching device, and the third switching device, wherein when the control circuit determines that a failure has occurred in the first rotary electric machine, the control circuit is configured to operate the second switching device to place the first rotary electric machine and the first transmission path in the disconnection state, and operate the third switching device to place the second rotary electric machine and the first transmission path in the connection state, and when the control device determines that a failure has occurred in the second rotary electric machine, the control device is configured to operate the second switching device to place the first rotary electric machine and the first transmission path in the connection state, and operate the third switching device to place the second rotary electric machine and the first transmission path in the disconnection state.

In the present invention, when the control circuit determines that a failure has occurred in either the first rotary electric machine or the second rotary electric machine, the internal combustion engine and the remaining one of the first rotary electric machine and the second rotary electric machine are used to enable the vehicle to travel. Therefore, a user in the vehicle can move the vehicle to an appropriate location for parking the vehicle such as a repair shop or the user's house.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a vehicle according to the present invention will be described with reference to the accompanying drawings.

Figure 1:
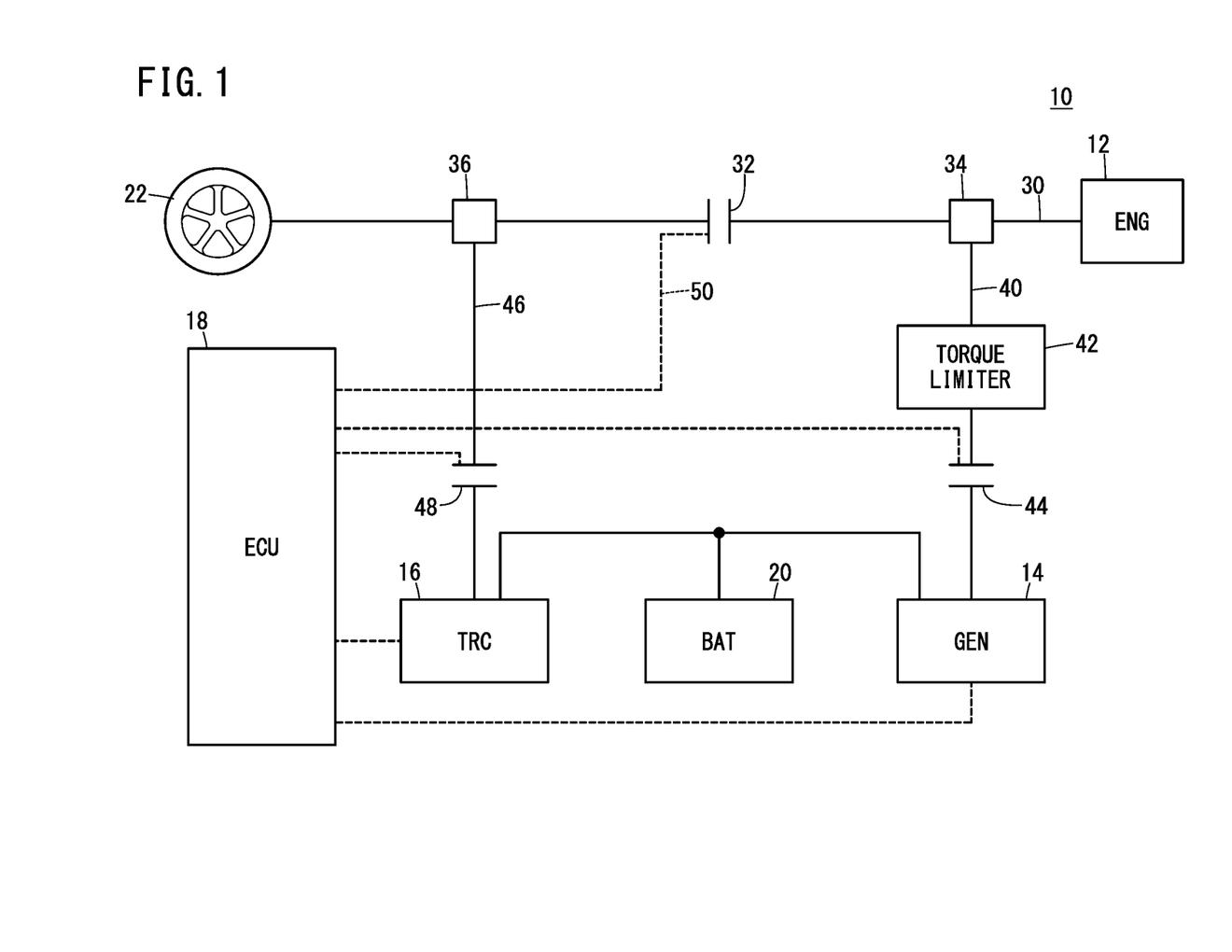
FIG. 1 is a diagram schematically showing structure of the vehicle according to an embodiment of the present invention.

FIG. 1 is a view showing structure of a vehicle 10 according to an embodiment of the present invention. This vehicle 10 is a so called hybrid vehicle, and includes an internal combustion engine 12 equipped with a vehicle body, a generator 14 as a first rotary electric machine, a traction motor 16 as a second rotary electric machine, an electric control unit (ECU) 18 as a control circuit, and a battery 20. It should be noted that, in FIG. 1, the internal combustion engine 12, the generator 14, the traction motor 16, and the battery 20 are referred to as the "ENG", "GEN", "TRC", and "BAT", respectively. Further, the vehicle 10 is provided with wheels 22 which are rotated by application of power from the internal combustion engine 12 or the traction motor 16 to the wheels 22.

A first transmission path 30 as a power transmission path is provided from the internal combustion engine 12 to the wheels 22. That is, the first transmission path 30 transmits the power generated in the internal combustion engine 12 to the wheels 22. The first transmission path 30 is provided with an ENG clutch 32 as a first switching device. Further, in the first transmission path 30, a first branch point 34 and a second branch point 36 are disposed on both sides of the ENG clutch 32. That is, the first branch point 34 is provided more on a side of the internal combustion engine 12 than the ENG clutch 32 is and the second branch point 36 is provided more on a side of the wheels 22 than the ENG clutch 32 is.

A second transmission path 40 as a power transmission path is communicated with the first branch point 34. The generator 14 is provided in this second transmission path 40. In the second transmission path 40, a torque limiter 42, and a GEN clutch 44 as the second switching device are interposed between the first branch point 34 and the generator 14.

On the other hand, a third transmission path 46 as the power transmission path is communicated with the second branch point 36. The traction motor 16 is provided in the third transmission path 46. In the third transmission path 46, a TRC clutch 48 as the third switching device is interposed between the traction motor 16 and the second branch point 36. It should be noted that, for example, each of the first branch point 34 and the second branch point 36 comprises a decelerator or an accelerator.

Further, the battery 20 is electrically connected to the generator 14 and the traction motor 16. It should be noted that the generator 14 is also electrically connected to the traction motor 16. That is, electrical energy can be supplied to the traction motor 16, from either the generator 14 or the battery 20 selectively, or from both of the generator 14 and the battery 20. Further, the traction motor 16 performs regeneration during braking (deceleration) of the vehicle 10, and supplies regenerative electrical energy to the battery 20 through an inverter (not shown).

In the above structure, the ENG clutch 32, the GEN clutch 44, the TRC clutch 48, the generator 14, and the traction motor 16 are electrically connected to the ECU 18 through a signal line 50.

The ECU 18 issues an instruction signal through the signal line 50, to activate each of the ENG clutch 32, the GEN clutch 44, and the TRC clutch 48. By activation of the ENG clutch 32 provided in the first transmission path 30, the internal combustion engine 12 and the wheels 22 are switched from the connection state to the disconnection state, or from the disconnection state to the connection state. It is a matter of course that, in the connection state, the power of the internal combustion engine 12 is transmitted to the wheels 22, and in the disconnection state, the power of the internal combustion engine 12 to the wheels 22 is interrupted.

Further, as a result of activating the GEN clutch 44 provided in the second transmission path 40, the first transmission path 30 and the generator 14 are switched from the connection state to the disconnection state, or switched from the disconnection state to the connection state. In the case where the first transmission path 30 and the generator 14 are in the connection state, the power of the internal combustion engine 12 is transmitted to the generator 14 through the first transmission path 30 and the second transmission path 40. The torque limiter 42 provided in the second transmission path 40 prevents transmission of the excessive torque from the generator 14 to the internal combustion engine 12 or from the internal combustion engine 12 to the generator 14. It should be noted that the torque limiter 42 may be disposed between the GEN clutch 44 and the generator 14.

As a result of transmission of the power of the internal combustion engine 12 to the generator 14, the generator 14 generates electrical energy. As described above, the generated electrical energy is supplied to the battery 20 or the traction motor 16. On the other hand, in the case where the first transmission path 30 and the generator 14 are in the disconnection state, the power of the internal combustion engine 12 is never transmitted to the generator 14.

Further, as a result of activating the TRC clutch 48 provided in the third transmission path 46, the first transmission path 30 and the traction motor 16 are switched from the connection state to the disconnection state, or from the disconnection state to the connection state. In the case where the first transmission path 30 and the traction motor 16 are in the connection state, the power of the traction motor 16 is transmitted to the wheels 22 through the third transmission path 46 and the first transmission path 30. As a result, the wheels 22 are rotated, and the vehicle 10 travels. On the other hand, in the case where the first transmission path 30 and the traction motor 16 are in the disconnection state, the power of the traction motor 16 is never transmitted to the wheels 22.

It should be noted that the internal combustion engine 12 and the wheels 22 may be placed in the connection state, and the first transmission path 30 and the traction motor 16 may be placed in the connection state. In this case, both of the power of the internal combustion engine 12 and the power of the traction motor 16 are transmitted to the wheels 22.

In this regard, a rotation angel sensor and/or a temperature sensor, etc. (all not shown) are provided for each of the generator 14 and the traction motor 16. By these sensors, the rotation speed and/or the temperature, etc. of the generator 14 and the traction motor 16 are measured individually all the time. Information regarding the rotation speed and/or the temperature, etc. is transmitted as an information signal to the ECU 18 through the signal line 50. Based on the information signal, the ECU 18 detects the rotation speed and/or the temperature, etc. of the generator 14 and the traction motor 16 individually.

When a failure has occurred in the generator 14 and/or the traction motor 16, though it depends on the cause, in most cases, the rotation speed of each rotation axis is reduced, and in some cases, for example, rotation of the rotation axis is stopped, or the temperature of the generator 14 or the traction motor 16 is increased. As a result, abnormality occurs in the rotation speed and/or the temperature. The ECU 18 detects this abnormality in the rotation speed and/or the temperature, etc. to determine that a failure has occurred in the generator 14 or the traction motor 16.

An instrumental panel provided in a vehicle compartment of the vehicle 10 is provided with an alarming light. When the ECU 18 determines that a failure has occurred in the generator 14 or the traction motor 16, the alarming light is turned on under control of the ECU 18. That is, an alarm is issued. It should be noted that the structure of incorporating the alarming light into an instrument panel is known, e.g., as a gasoline quantity alarming light in a gasoline vehicle and/or a coolant water temperature alarming light, etc. Therefore, the structure is not illustrated or detailed description of the structure is omitted.

The vehicle 10 according to the embodiment of the present invention basically has the above structure. Next, operation and advantages of the vehicle 10 will be described in relation to a control method when a failure has occurred in the generator 14 or the traction motor 16.

Figure 2:
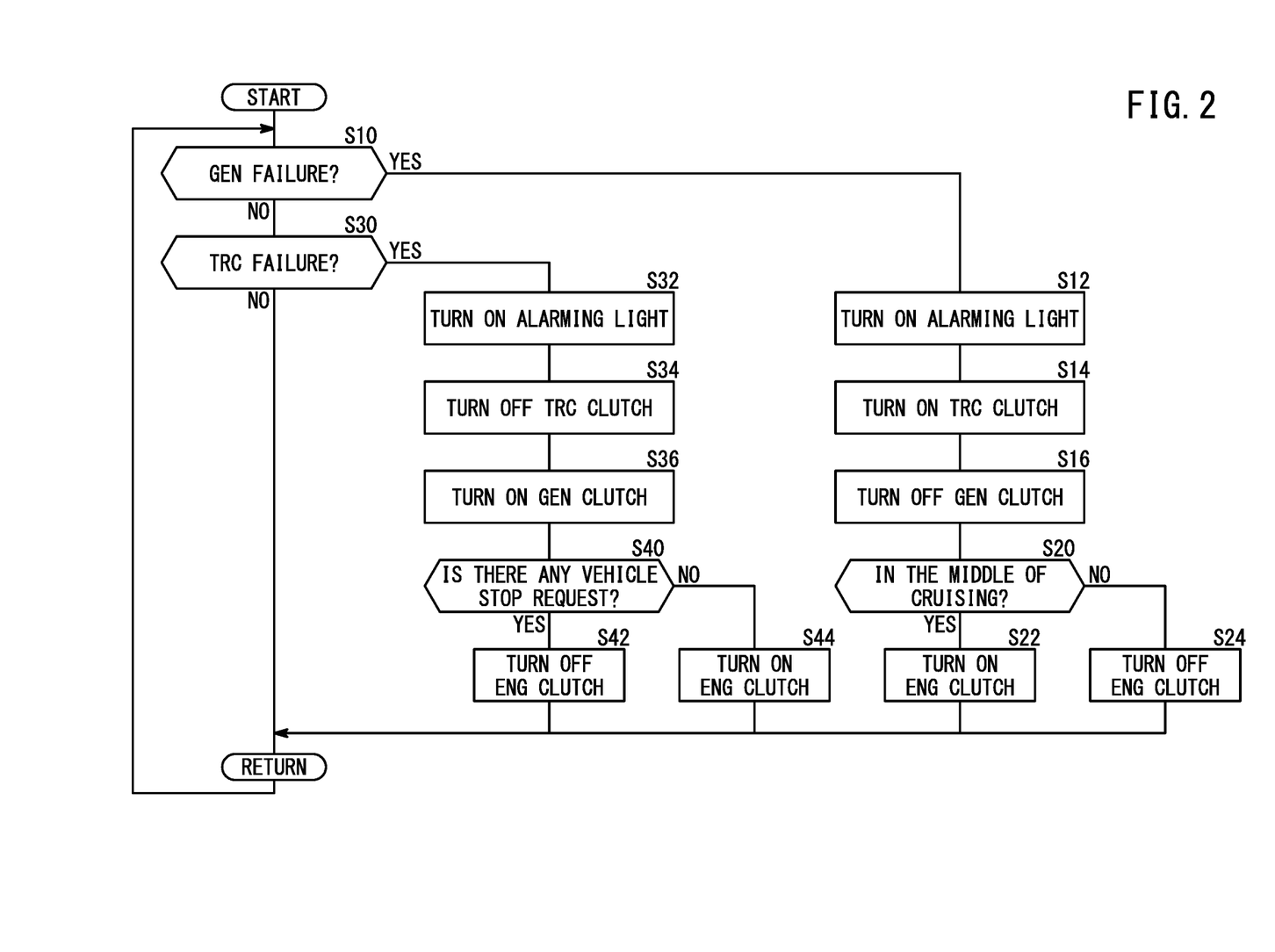
FIG. 2 is a flow chart of a control method, implemented in the vehicle, when it is determined that a failure has occurred in a first rotary electric machine or a secondary rotary electric machine.

FIG. 2 shows a schematic flow of a control method performed by the ECU 18. The control method includes a first determination step S10 of determining whether or not a failure has been occurred in the generator 14, a second determination step S20 of determining whether or not the vehicle 10 is in the middle of cruising, a third determination step S30 of determining whether or not a failure has been occurred in the traction motor 16, and a fourth determination step S40 of determining whether or not a request for the stop of traveling has been made.

As described above, the temperature of the generator 14, the rotation speed of the rotational axis of the generator 14, etc. are transmitted as the information signal to the ECU 18. The ECU 18 monitors whether or not the temperature and the rotational speed of the generator 14, etc. are within a normal range all the time based on the information signal. Then, in the case where the temperature and the rotational speed of the generator 14, etc. fall out of the normal range, stated otherwise, in the case where an abnormal value is detected, the ECU 18 determines that a failure has occurred in the generator 14 ("YES" in the first determination step S10).

In this case, the routine proceeds to step S12, and the ECU 18 issues an alarm by turning on the alarming light. Users such as a driver and/or passengers of the vehicle 10 visually recognize that the alarming light has been turned on, and thus, can recognize that "A failure has occurred in either the generator 14 or the traction motor 16." Therefore, it is possible to prompt the user to move the vehicle 10 to an appropriate location for parking the vehicle 10, e.g., a repair shop or the user's house.

Thereafter, in step S14, the TRC clutch 48 is turned on. As a result, the traction motor 16 is placed on the connection state where the traction motor 16 is connected to the first transmission path 30. Further, in step S16, the GEN clutch 44 is turned off (OFF). As a result, the generator 14 is decoupled from the first transmission path 30 (disconnection state). It should be noted that the steps S12, S14, and S16 can be performed in an arbitrary order.

Figure 3:
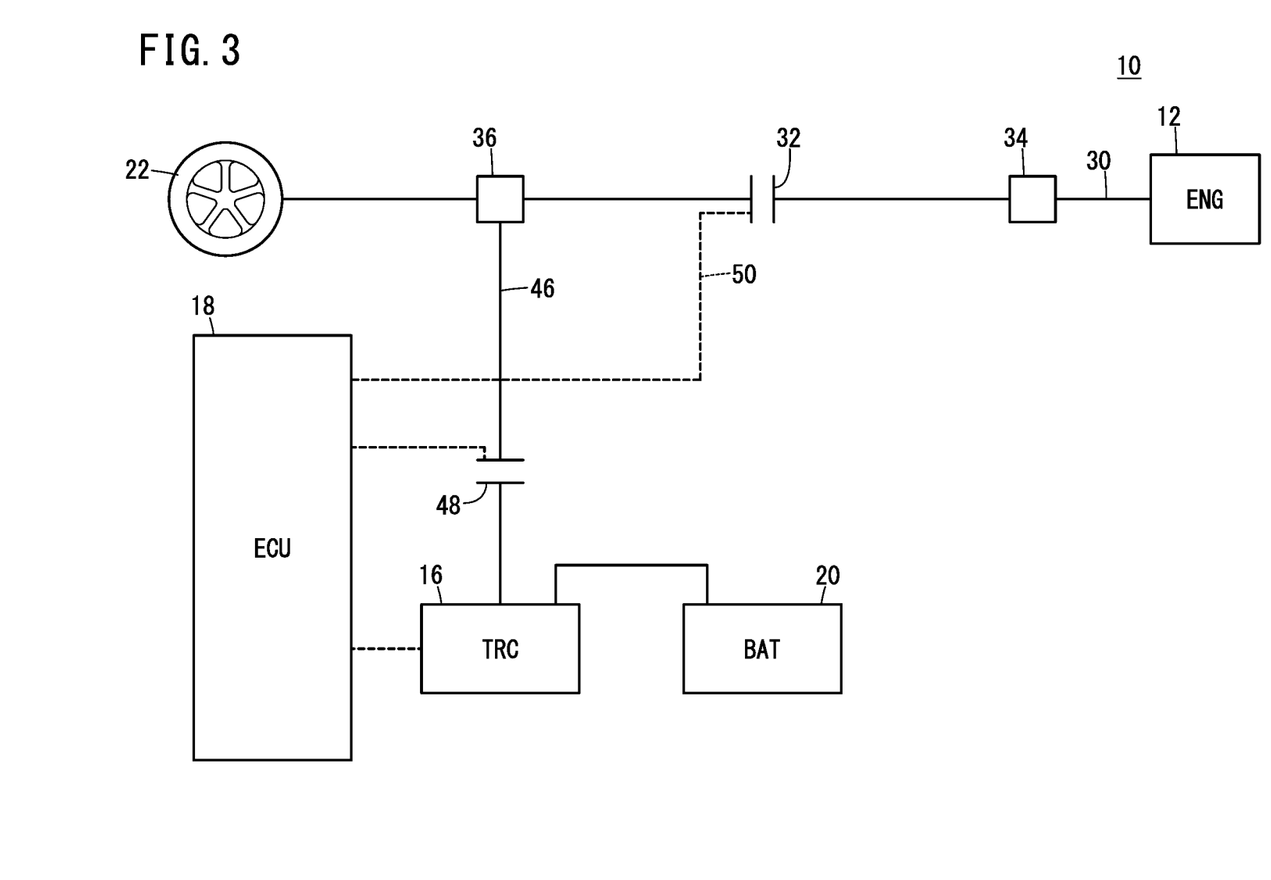
FIG. 3 is a diagram showing equivalent structure when a failure has occurred in the first rotary electric machine.

Since the generator 14 is decoupled from the first transmission path 30 (i.e., electric power generation is stopped), the structure of FIG. 1 becomes equivalent to the structure shown in FIG. 3. Operation of the vehicle 10 is performed in this state. Then, in the second determination step S20, it is determined whether the vehicle 10 is in the middle of traveling at a substantially constant velocity, i.e., whether or not the vehicle is in the middle of cruising. When the vehicle 10 is in the middle of cruising, that is, in the case where the determination in the second determination step S20 is "YES"), the routine proceeds to step S22, and the ENG clutch 32 is turned on (ON), and the internal combustion engine 12 and the wheels 22 are placed in the connection state. Therefore, the wheels 22 to which the power of the internal combustion engine 12 is applied are rotated, and as a result, the vehicle 10 travels.

Further, the TRC clutch 48 is turned on (ON), and the traction motor 16 is connected to the first transmission path 30. As a result, the internal combustion engine 12 and the traction motor 16 are placed in the connection state. Thus, the power of the internal combustion engine 12 is distributed to the traction motor 16 and the wheels 22. Therefore, the traction motor 16 performs electric power generation, and charging of the battery 20 is performed. That is, when it is determined that a failure has occurred in the generator 14, in the case where the vehicle 10 is in the middle of cruising, the ECU 18 uses part of the power of the internal combustion engine 12 to rotate the wheels 22 to make the vehicle 10 travel, and uses the remaining power of the internal combustion engine 12 to make the traction motor 16 perform electric power generation to charge the battery 20.

In contrast, in the case where the vehicle 10 is not in the middle of cruising (the determination in the second determination step S20 is "NO"), the routine proceeds to step S24, and the ENG clutch 32 is turned off (OFF). That is, the internal combustion engine 12 and the traction motor 16 are placed in the disconnection state. The case where the vehicle 10 is not in the middle of cruising herein means the cases, e.g., when the vehicle 10 changes the state from "stop" to "movement", when the vehicle 10 is in the middle of acceleration from the cruise state, when the vehicle 10 is in the middle of deceleration from the cruise state (when braking is applied), when the vehicle 10 is stopped, etc.

In the case of movement start, or acceleration, the TRC clutch 48 is turned on (ON), and the traction motor 16 is connected to the first transmission path 30. Therefore, the power of the traction motor 16 which has been placed in the power running state by receiving electrical energy from the battery 20, is transmitted to the wheels 22. That is, the vehicle 10 starts movement or accelerates only by the power of the traction motor 16.

On the other hand, also in the case of deceleration, the TRC clutch 48 is turned on (ON), and the traction motor 16 is connected to the first transmission path 30. During deceleration, the traction motor 16 performs regeneration, and supplies regenerative electrical energy to the battery 20 through an inverter (not shown) as described above.

Figure 4:
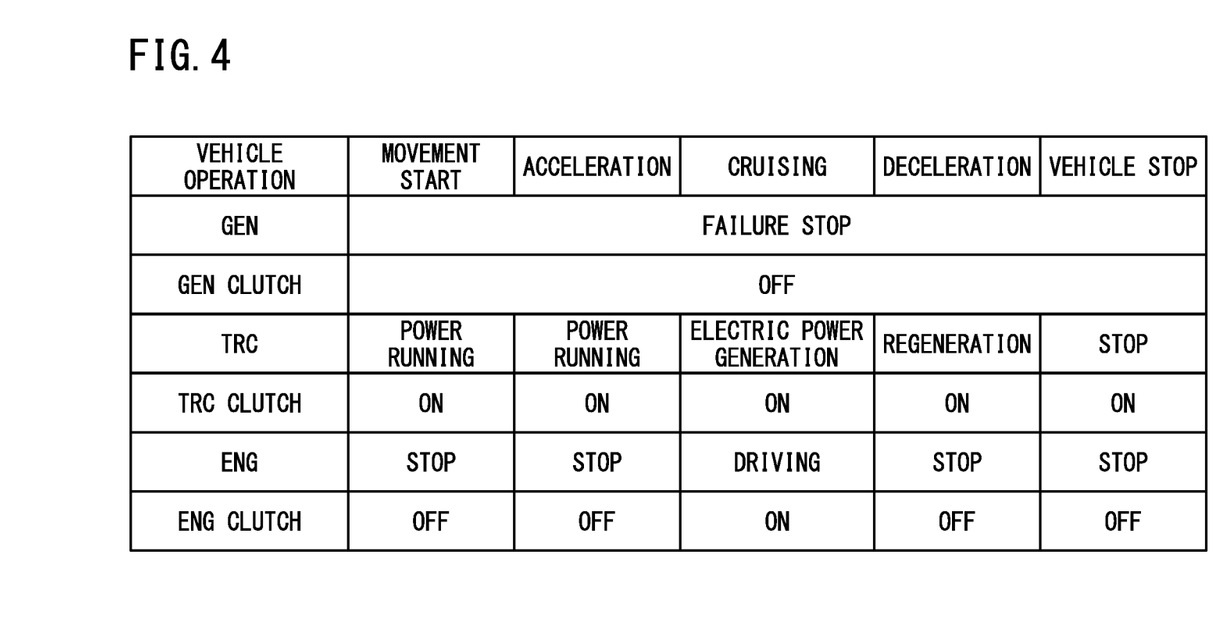
FIG. 4 is a map showing conditions of the vehicle, switching devices, an internal combustion engine, the first rotary electric machine, and the second rotary electric machine when a failure has occurred in the first rotary electric machine.

Further, when the vehicle 10 is stopped, the traction motor 16 and the internal combustion engine 12 are stopped. FIG. 4 is a map showing the conditions of the vehicle 10, and the state of each of the generator 14, the traction motor 16, and the internal combustion engine 12, and the state of each of the GEN clutch 44, the TRC clutch 48, and the ENG clutch 32.

As described above, the vehicle 10 is equipped with the GEN clutch 44 as the second switching device and the TRC clutch 48 as the third switching device. Therefore, when it is determined that a failure has occurred in the generator 14, the GEN clutch 44 is turned off (OFF), and the TRC clutch 48 is turned on (ON) to make the vehicle 10 travel provisionally by the internal combustion engine 12 and the traction motor 16. Further, during the cruise, the internal combustion engine 12 makes the traction motor 16 generate electrical energy to charge the battery 20 to obtain the sufficient electrical energy. Therefore, though the generator 14 has the failure, for example, the vehicle 10 can travel to the repair shop by itself without requiring supply of electrical energy from the outside.

On the other hand, if it is determined that no failure has occurred in the generator 14 ("NO" in the first determination step S10), the routine proceeds to the third determination step S30. In this third determination step S30, it is determined whether or not a failure has occurred in the traction motor 16. If it is determined that no failure has occurred ("NO" in the third determination step S30), the routine returns to the first determination step S10.

In the case where the ECU 18 determines that the temperature and the rotation speed, etc. of the traction motor 16 has any abnormal value, the ECU 18 determines that a failure has occurred in the traction motor 16 ("YES" in the third determination step S30). In this case, the routine proceeds to step S32, and the ECU 18 turns on the alarming light to issue an alarm. The user of the vehicle 10 visually recognizes that the alarming light has been turned on, and thus, can recognize that "A failure has occurred in either the generator 14 or the traction motor 16."

It should be noted that the alarming light for dedicated use of the generator 14 and the alarming light for dedicated use of the traction motor 16 may be provided individually. It is because, in this case, the user can clearly recognize that a failure has occurred in either the generator 14 or the traction motor 16.

Thereafter, in step S34, the TRC clutch 48 is turned off (OFF). As a result, the traction motor 16 is placed in the disconnection state where the traction motor 16 is not connected to the first transmission path 30. Further, thereafter, in step S36, the GEN clutch 44 is turned on (ON). As a result, the generator 14 is connected to the first transmission path 30. It should be noted that steps S32, S34, and S36 may be performed in an arbitrary order.

Figure 5:
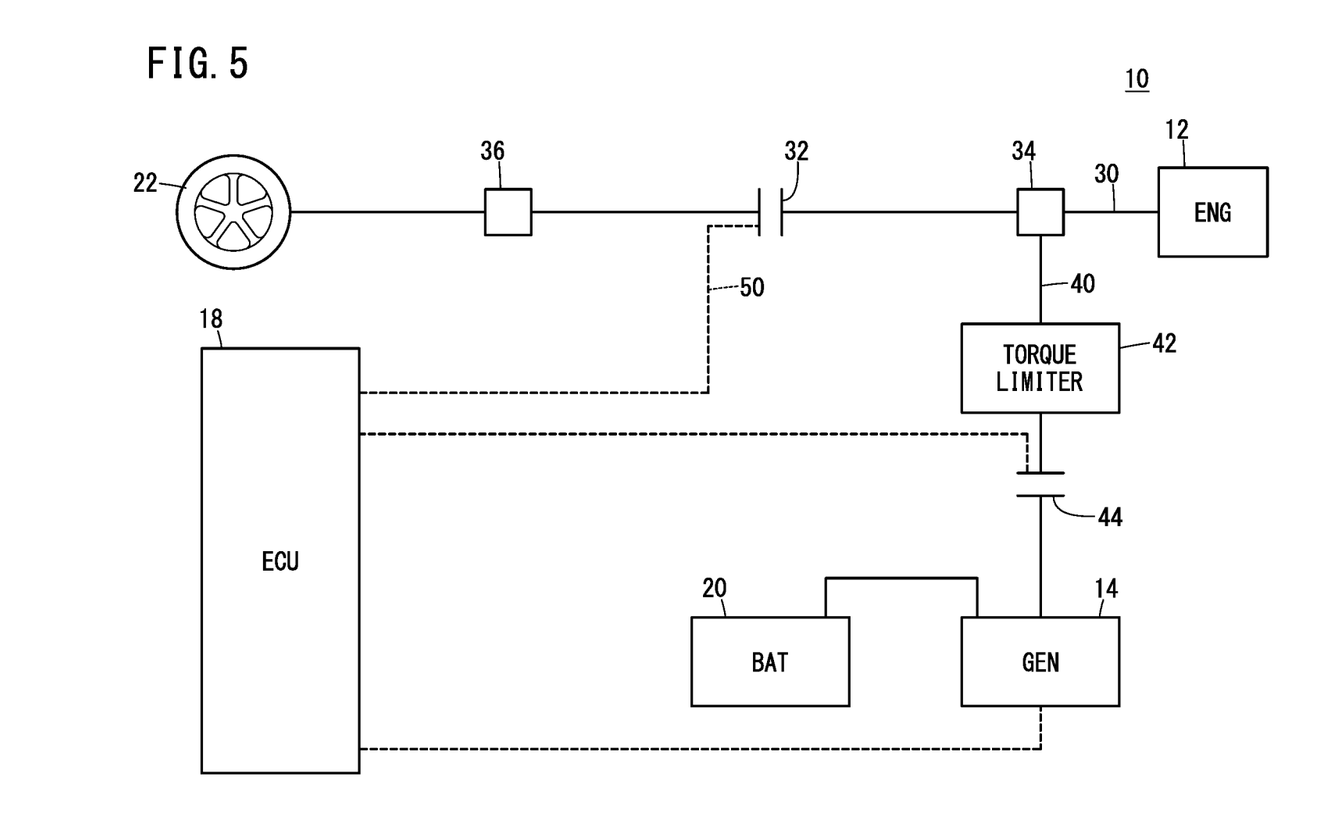
FIG. 5 is a diagram showing equivalent structure of the vehicle when a failure has occurred in the second rotary electric machine.

Since the traction motor 16 is decoupled from the first transmission path 30, the structure of FIG. 1 becomes equivalent to the structure shown in FIG. 5. The vehicle 10 is driven in this state. Then, in the fourth determination step S40, it is determined whether or not a request for stopping travel of the vehicle 10 (vehicle stop) has been made. If there is a request for stopping travel, i.e., if the determination in the fourth determination step S40 is "YES", the routine proceeds to step S42 to turn off the ENG clutch 32 (OFF), and the internal combustion engine 12 and the wheels 22 are placed in the disconnection state. Therefore, application of the power of the internal combustion engine 12 to the wheels 22 is stopped. As a result, the vehicle 10 is stopped.

In contrast, if there is no request for stopping travel ("NO" in the fourth determination step S40), the vehicle 10 is in any of the movement start state, the acceleration state, the cruise state, or the deceleration (braking) state. In this case, the routine proceeds from the fourth determination step S40 to the step S44, and the ENG clutch 32 is turned on (ON), and the internal combustion engine 12 and the wheels 22 are placed in the connection state. Therefore, the wheels 22 to which the power of the internal combustion engine 12 is applied are rotated, and as a result, the vehicle 10 is kept in the travel state.

In the meanwhile, since the GEN clutch 44 is kept in the ON state, the connection state of the generator 14 where the generator 14 is connected to the first transmission path 30 is maintained. Therefore, the internal combustion engine 12 and the generator 14 are placed in the connection state, and the generator 14 and the wheels 22 are placed in the connection state. Therefore, at the time of movement start and at the time of acceleration, the power is transmitted to the wheels 22 from both of the internal combustion engine 12 and the generator 14 in the power running state. The vehicle 10 which received this power, starts to move and accelerates.

Further, in the case where the vehicle 10 is in the cruise state, the power of the internal combustion engine 12 is distributed to the generator 14 and the wheels 22. Therefore, the generator 14 performs electric power generation, and charging of the battery 20 is performed. That is, when it is determined that a failure has occurred in the traction motor 16, and the vehicle 10 is in the middle of cruising, the ECU 18 rotates the wheels 22 using part of the power of the internal combustion engine 12 to make the vehicle 10 travel, and performs electric power generation of the generator 14 using the remaining power of the internal combustion engine 12 to charge the batter 20.

Figure 6:
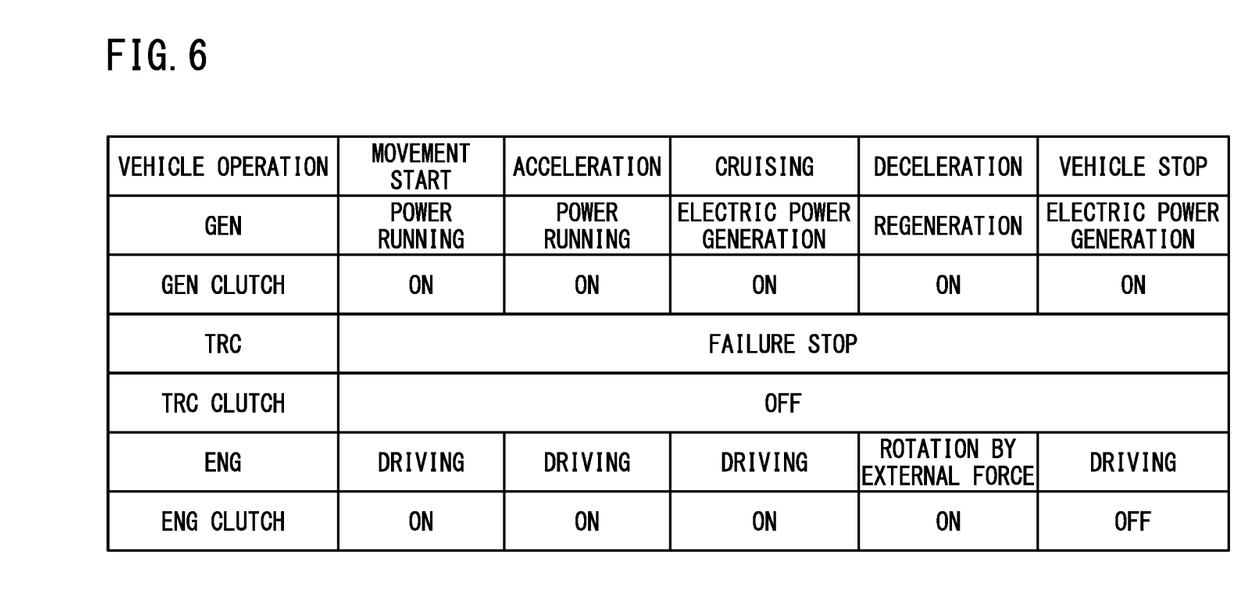
FIG. 6 is a map showing conditions of the vehicle, the switching devices, the internal combustion engine, the first rotary electric machine, and the second rotary electric machine when a failure has occurred in the second rotary electric machine.

Further, during deceleration (braking) of the velocity from the cruise, the generator 14 performs regeneration, and supplies the regenerative electrical energy to the battery 20 through an inverter (not shown) in the same manner as described above. As a result, charging of the battery 20 is performed. FIG. 6 is a map showing conditions of the vehicle 10, and the state of each of the generator 14, the traction motor 16, and the internal combustion engine 12, and the state of each of the GEN clutch 44, the TRC clutch 48, and the ENG clutch 32.

During braking, a crankshaft of the internal combustion engine 12 is rotated by rotation of the wheels 22. That is, at this time, in the internal combustion engine 12, the crankshaft is rotated by the external force. The "ROTATION BY EXTERNAL FORCE" in FIG. 6 shows this condition.

As described above, when it is determined that a failure has occurred in the traction motor 16, the TRC clutch 48 is turned off (OFF), and the GEN clutch 44 is turned on (ON) for enabling the vehicle 10 to travel provisionally by the internal combustion engine 12 and the generator 14. That is, the vehicle 10 is equipped with the GEN clutch 44 as the second switching device, and the TRC clutch 48 as the third switching device for enabling the vehicle 10 to travel provisionally by the internal combustion engine 12 and the generator 14. Further, during the cruise, electric power generation of the generator 14 is performed by the internal combustion engine 12 to charge the battery 20, and obtain the sufficient electrical energy. Therefore, even if a failure has occurred in the traction motor 16, also in the case where a failure has occurred in the generator 14, it becomes possible for the vehicle to move to, e.g., the repair shop by itself without requiring supply of electrical energy from the outside.

That is, in the embodiment of the present invention where the GEN clutch 44 and the TRC clutch 48 are provided, even if a failure has occurred in either the traction motor 16 or the generator 14, the vehicle 10 can travel in a limp home mode. Therefore, it is possible to move the vehicle 10 to the repair shop, the user's house, etc.

The present invention is not limited specially to the above described embodiment. It is a matter of course various modifications may be made without departing from the gist of the present invention.

For example, the traction motor 16 may be the first rotary electric machine, and the generator 14 may be the second rotary electric machine.

What is claimed is:
1. A vehicle comprising:
an internal combustion engine;
a first transmission path configured to transmit power generated by the internal combustion engine to wheels;
a first switching device disposed in the first transmission path, and configured to performing switching of the internal combustion engine and the wheels between a connection state and a disconnection state;
a first rotary electric machine;

a first branch point provided in the first transmission path, more on a side of the internal combustion engine than the first switching device is;
a second transmission path configured to connect the first branch point and the first rotary electric machine;
a second switching device disposed in the second transmission path, and configured to perform switching of the first transmission path and the first rotary electric machine between a connection state and a disconnection state;
a second rotary electric machine;
a second branch point provided in the first transmission path, more on a side of the wheels than the first switching device is;
a third transmission path configured to connect the second branch point and the second rotary electric machine;
a third switching device disposed in the third transmission path, and configured to perform switching of the first transmission path and the second rotary electric machine between a connection state and a disconnection state;
a control circuit configured to control the first switching device, the second switching device, and the third switching device;
wherein when the control circuit determines that a failure has occurred in the first rotary electric machine, the control circuit is configured to operate the second switching device to place the first rotary electric machine and the first transmission path in the disconnection state, and operate the third switching device to place the second rotary electric machine and the first transmission path in the connection state; and
when the control circuit determines that a failure has occurred in the second rotary electric machine, the control circuit is configured to operate the second switching device to place the first rotary electric machine and the first transmission path in the connection state, and operate the third switching device to place the second rotary electric machine and the first transmission path in the disconnection state.

2. The vehicle according to claim 1, wherein when the control circuit determines that a failure has occurred in the first rotary electric machine or the second rotary electric machine, the control circuit issues an alarm.

3. The vehicle according to claim 1, wherein when the control circuit determines that a failure has occurred in the first rotary electric machine, the control circuit determines whether the vehicle is in middle of cruising, and if the vehicle is in the middle of cruising, the control circuit performs control to place the first switching device in the connection state, and if the vehicle is not in the middle of cruising, the control circuit performs control to place the first switching device in the disconnection state.

4. The vehicle according to claim 1, wherein when the control circuit determines that a failure has occurred in the second rotary electric machine, the control circuit determines whether or not a request for stopping travel of the vehicle has been made, and if the request for stopping travel of the vehicle has been made, the control circuit performs control to place the first switching device in the disconnection state, and if the request for stopping travel of the vehicle has not been made, the control circuit performs control to place the first switching device in the connection state.

* * * * *